US012183034B2

(12) United States Patent
Cejka et al.

(10) Patent No.: US 12,183,034 B2
(45) Date of Patent: Dec. 31, 2024

(54) SYSTEM AND METHOD FOR UTILIZATION OF DISPLACEMENT SENSOR DURING PLACEMENT OF VEHICLE SERVICE FIXTURE

(71) Applicant: Hunter Engineering Company, Bridgeton, MO (US)

(72) Inventors: Brian M. Cejka, Des Peres, MO (US); Asher L. Haggard, St. Louis, MO (US); Daniel R. Dorrance, Ballwin, MO (US)

(73) Assignee: Hunter Engineering Company, St. Louis, MO (US)

( * ) Notice: Subject to any disclaimer, the term of this patent is extended or adjusted under 35 U.S.C. 154(b) by 0 days.

(21) Appl. No.: 18/366,997

(22) Filed: Aug. 8, 2023

(65) Prior Publication Data
US 2023/0386080 A1    Nov. 30, 2023

Related U.S. Application Data

(60) Continuation of application No. 17/482,726, filed on Sep. 23, 2021, now Pat. No. 11,763,486, which is a continuation-in-part of application No. 17/147,896, filed on Jan. 13, 2021, now Pat. No. 11,610,335, which is a division of application No. 16/538,245, filed on Aug. 12, 2019, now Pat. No. 11,145,084.

(60) Provisional application No. 62/725,023, filed on Aug. 30, 2018.

(51) Int. Cl.
G06T 7/73      (2017.01)
G01S 7/40      (2006.01)
G01S 7/497     (2006.01)
G06T 7/246     (2017.01)
H04N 23/54     (2023.01)
H04N 23/695    (2023.01)
H04N 23/90     (2023.01)

(52) U.S. Cl.
CPC ............... *G06T 7/74* (2017.01); *G06T 7/248* (2017.01); *H04N 23/54* (2023.01); *H04N 23/695* (2023.01); *H04N 23/90* (2023.01); *G01S 7/4026* (2013.01); *G01S 7/4972* (2013.01); *G06T 2207/30252* (2013.01)

(58) Field of Classification Search
CPC . G06T 7/74; G06T 7/248; G06T 2207/30252; H04N 23/54; H04N 23/695; H04N 23/90; H04N 23/56; G01S 7/4026; G01S 7/4972; G01S 7/481; G01S 17/931; G01S 13/931
See application file for complete search history.

(56) References Cited

U.S. PATENT DOCUMENTS 7,177,740 B1    2/2007  Guangjun et al.
7,424,387 B1    9/2008  Gill et al.
10,458,811 B2   10/2019 Voeller et al.
(Continued)

*Primary Examiner* — Nasim N Nirjhar
(74) *Attorney, Agent, or Firm* — Sandberg Phoenix & von Gontard P.C.

(57) ABSTRACT

A machine-vision vehicle service system, and methods of operation, incorporating at least one displacement sensor to acquire measurements associated with physical floor surfaces in proximity to a vehicle undergoing service or inspection. The acquired measurements are utilized to guiding placement of ADAS target components on a floor surface accounting for deviations from an established vehicle reference plane.

17 Claims, 10 Drawing Sheets

(56) References Cited

U.S. PATENT DOCUMENTS

| | | |
|---|---|---|
| 10,996,314 B2 | 5/2021 | Stieff et al. |
| 2005/0096807 A1 | 5/2005 | Murray |
| 2015/0317780 A1 | 11/2015 | Dumont et al. |
| 2015/0356737 A1 | 12/2015 | Ellsworth |
| 2016/0239013 A1 | 8/2016 | Troy et al. |
| 2016/0291160 A1 | 10/2016 | Zweigle et al. |
| 2016/0327383 A1* | 11/2016 | Becker .................. G01B 11/25 |
| 2018/0104825 A1 | 4/2018 | Vulcano et al. |
| 2019/0331482 A1* | 10/2019 | Lawrence .......... G01B 11/2755 |
| 2020/0001414 A1 | 1/2020 | Wen |
| 2021/0012520 A1* | 1/2021 | Zhou ..................... G01C 11/08 |

* cited by examiner

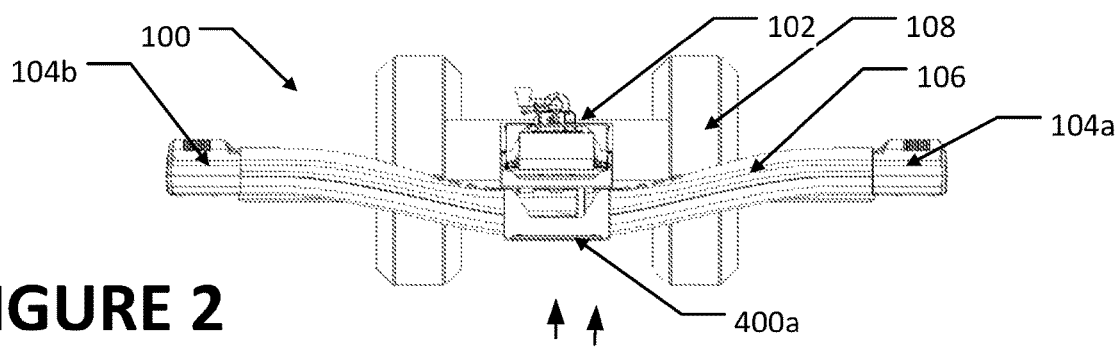
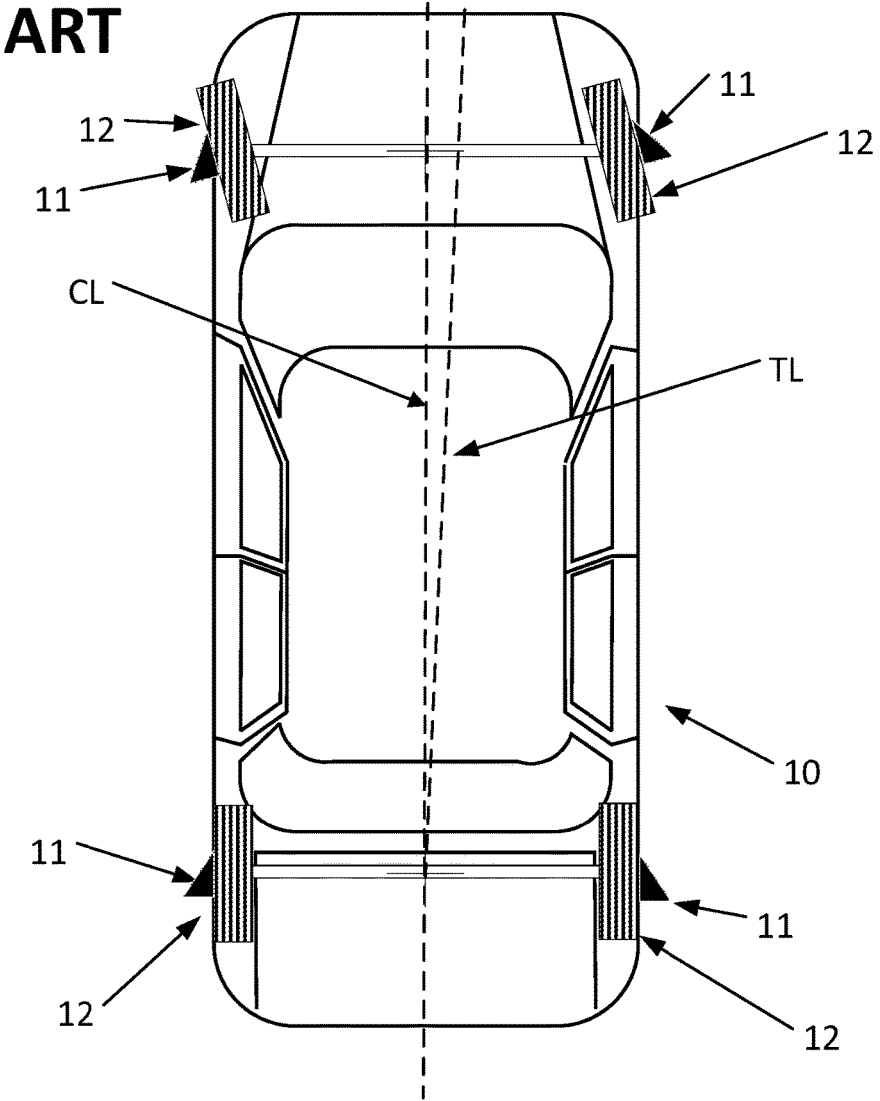
**FIGURE 2
PRIOR ART**

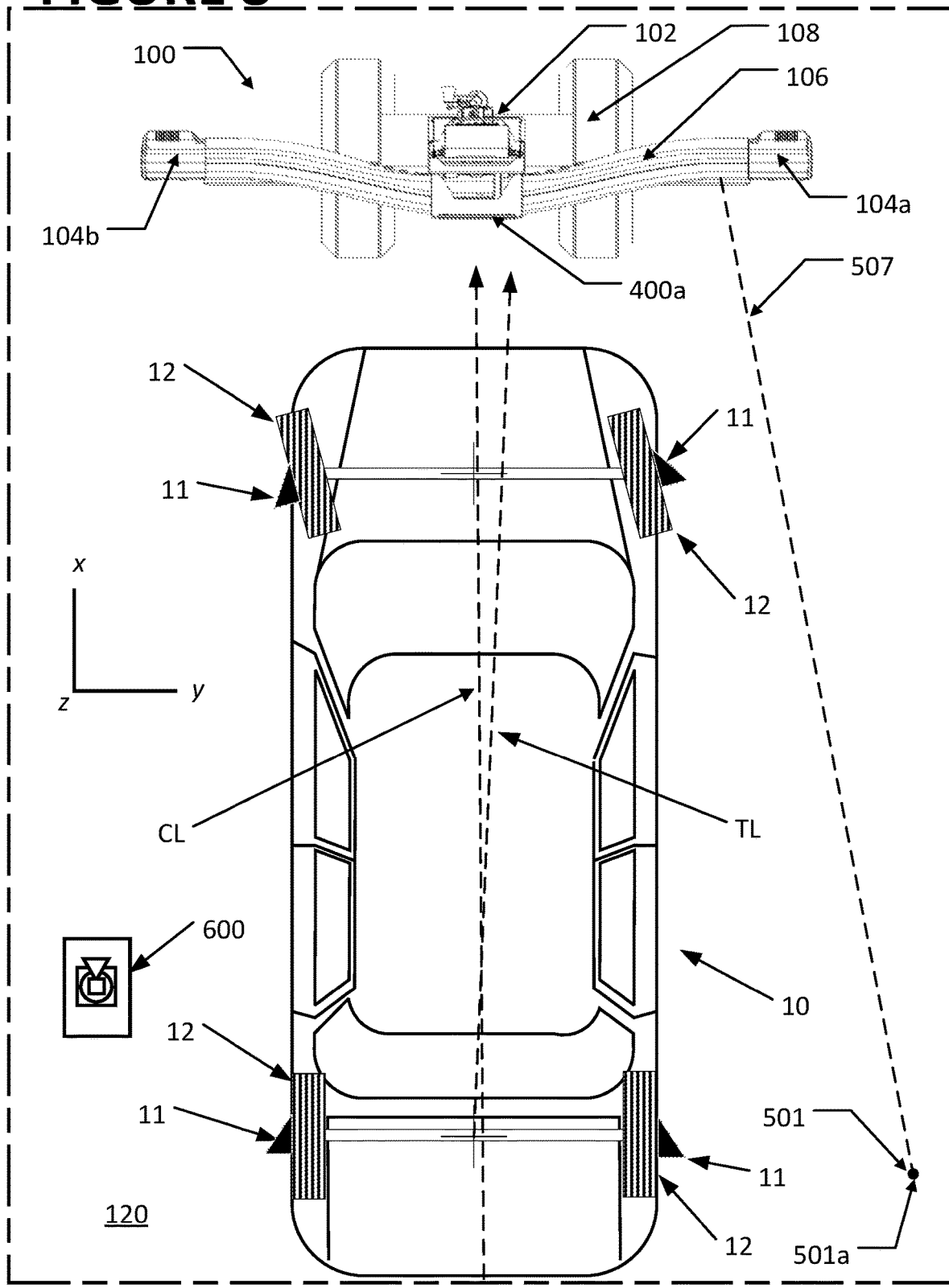

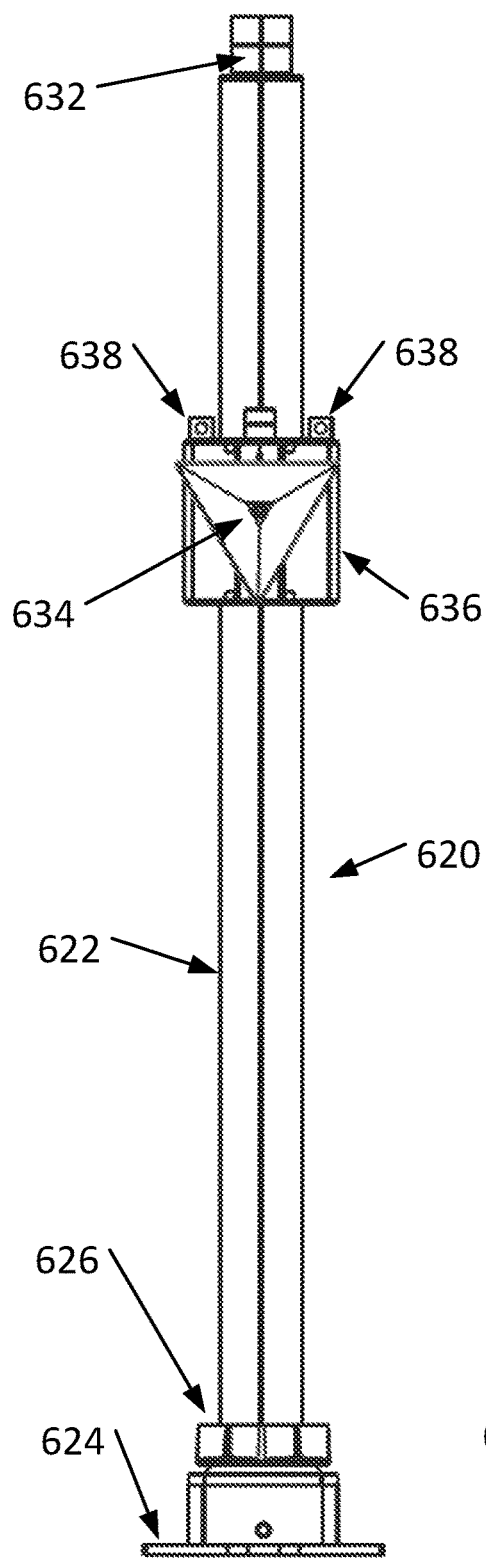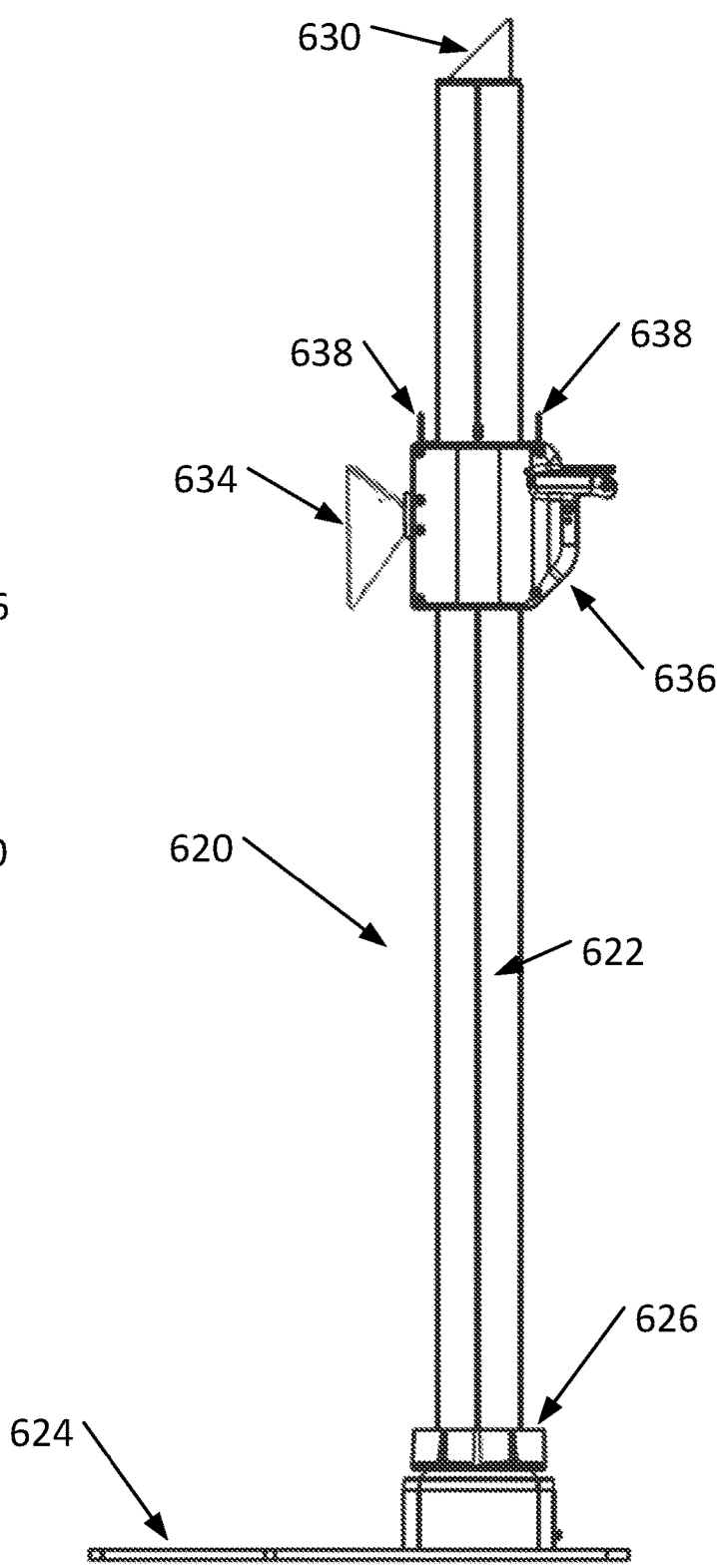
FIGURE 9    FIGURE 10

SYSTEM AND METHOD FOR UTILIZATION OF DISPLACEMENT SENSOR DURING PLACEMENT OF VEHICLE SERVICE FIXTURE

CROSS-REFERENCE TO RELATED APPLICATIONS

The present application is a continuation of co-pending U.S. patent application Ser. No. 17/482,726 filed on Sep. 23, 2021, which in turn is a continuation-in-part of, and claims priority from, U.S. patent application Ser. No. 17/147,896 filed on Jan. 13, 2021, now U.S. Pat. No. 11,610,335 B2 which in turn is a division of, and claims priority from, U.S. patent application Ser. No. 16/538,245 filed on Aug. 12, 2019, now U.S. Pat. No. 11,145,084 B2. The '245 application claims priority to U.S. Provisional Patent Application Ser. No. 62/725,023 filed on Aug. 30, 2018. Each of the aforementioned patents and applications is herein incorporated by reference.

STATEMENT REGARDING FEDERALLY SPONSORED RESEARCH

Not Applicable.

BACKGROUND OF THE INVENTION

The present application is related to a fixture for facilitating the calibration and alignment of vehicle safety system sensors, and in particular, to a movable fixture supporting vehicle wheel alignment system imaging sensors and for facilitating proper placement of at least one calibration or alignment target associated with a vehicle safety system sensor in operative proximity to a vehicle undergoing a service or inspection.

Vehicle wheel measurement systems, such as wheel alignment or inspection systems employing machine vision technology, such as cameras observing optical targets mounted on various surfaces within associated fields of view are well known in the vehicle measurement, alignment, and inspection industry. Typically, these types of systems employ multiple cameras, mounted to a crossbeam member on a fixture or structure located in front of a vehicle service area. The cameras are oriented such that each wheel of a vehicle to be inspected (or target mounted thereon) within the service area is visible to at least one of the cameras. The structure supporting the camera crossbeam may be fixed in place, or may be mobile, configured to be moved from one service area to another as needed. The camera crossbeam itself may be vertically (and/or rotationally) adjustable to accommodate vehicles at different elevations of a lift rack within the vehicle service. Images acquired by the cameras are conveyed to a wheel alignment processing system configured with suitable software instructions for image evaluation, determining various spatial measurements associated with the observed surfaces, and ultimately for identifying vehicle wheel alignment angles from associated spatial measurements.

When it is necessary to realign or recalibrate various vehicle safety system sensors, such as radar units or optical sensors typically utilized in forward collision avoidance systems or adaptive cruise control systems, specialized structures are precisely positioned in proximity to the vehicle, often with the aid of a vehicle measurement system such as a wheel alignment or inspection system. For example, U.S. Pat. No. 7,382,913 B2 to Dorrance describes a method and apparatus for guiding placement of a vehicle service apparatus relative to a vehicle, based on measurements acquired by a separate vehicle wheel alignment measurement system. Other techniques for guiding placement of a specialized structure relative to a vehicle undergoing a realignment or recalibration of a vehicle safety system sensor include the use of laser emitters and leveling devices, such as shown in U.S. Pat. No. 6,583,868 B2 to Hopfenmuller.

Positionable fixtures or support structures capable of supporting both the cameras associated with a vehicle measurement system as well as specialized structures required for realignment or recalibration of onboard vehicle safety system sensor, such as shown in Published International Patent Application No. WO 2018/067354 A1 to Hunter Engineering Company have been developed, thereby reducing the total number of fixtures required to complete a vehicle onboard sensor realignment or recalibration, and eliminating potential spatial conflicts between support structures and specialized structures.

However, some specialized structures or optical targets used in the alignment or calibration of onboard vehicle safety system sensors cannot be secured to the positionable fixture or support structure. Accordingly, there is a need to provide a system to guide an operator in the proper placement of those specialized support structures or optical targets relative to either the vehicle undergoing service or to the positionable fixture or support structure itself. In some cases, the operator may require guidance as to the proper placement of the positionable fixture or support structure itself.

BRIEF SUMMARY OF THE INVENTION

Briefly stated, the present disclosure sets forth a fixture or support structure having a vertical element supporting a set of cameras associated with a vehicle measurement system, together with at least one gimbaled guidance system disposed to project visible indicia onto surfaces in proximity to the fixture or support structure for guiding relative placement of vehicle service components. A camera crossbeam carried by the fixture or support structure locates the set of cameras in a laterally spaced arrangement, as required to view wheels on each side of a vehicle undergoing measurement, wheel alignment, or inspection, and is optionally vertically (and/or rotationally) adjustable to accommodate the vehicle disposed at different elevations on an adjustable lift rack. The gimbaled guidance system is carried by the camera crossbeam structure, and is operatively coupled to a processing system configured with software instructions to selectively control an orientation of the gimbaled guidance system about one or more axis of rotation, enabling projection of visible indicia onto surfaces at selected locations relative to the vehicle or the support structure.

In a further embodiment, the present disclosure sets forth a fixture or support structure having a vertical element supporting a set of cameras associated with a vehicle measurement system, together with at least one gimbaled measurement system disposed to acquire data associated with surfaces in proximity to the fixture or support structure for guiding relative placement of vehicle service components. A camera crossbeam carried by the fixture or support structure locates the set of cameras in a laterally spaced arrangement, as required to view wheels on each side of a vehicle undergoing measurement, wheel alignment, or inspection, and is optionally vertically (and/or rotationally) adjustable to accommodate the vehicle disposed at different elevations on an adjustable lift rack. The gimbaled measurement system is carried by the camera crossbeam structure, and is operatively coupled to a processing system configured with software instructions to selectively control an orientation of the gimbaled measurement system about one or more axis of rotation, enabling acquisition of images from either a camera having a field of view oriented parallel to one of the axis of rotation, or distance measurements along a measurement axis aligned with one of the axis of rotation to surfaces at selected locations relative to the vehicle or the support structure.

In a method of the present disclosure, proper placement of vehicle service fixtures relative to a vehicle undergoing service or inspection can be verified by: (1) establishing a location of the vehicle within a vehicle reference frame; (2) identifying a placement location for the vehicle service fixture relative to the vehicle within the vehicle frame of reference; (3) directing an operator to position the vehicle service fixture at the identified placement location; (4) orienting a field of view of a movable camera to acquire an image of the identified placement location, where the camera has a known position and orientation within the vehicle frame of reference; and (5) evaluating the acquired image to identify a presence or an absence of the vehicle service fixture.

In an alternative method, proper placement of vehicle service fixtures relative to a vehicle undergoing service or inspection can be verified after placement of the fixture by an operator by: (1) orienting a measurement axis of a movable range sensor towards an expected location of a surface on the vehicle service fixture, wherein the movable range sensor disposed at a known position within a vehicle frame of reference; (2) acquiring a distance measurement to a surface on the measurement axis; (3) evaluating the acquired distance measurement to identify a presence or an absence of the vehicle service fixture at the identified placement location; and (4) responsive to an identified presence of the vehicle service fixture, comparing the acquired distance measurement with an expected distance measurement based on a known position of the movable sensor and the identified placement location, to determine if the vehicle service fixture is properly positioned at the identified location to within an acceptable tolerance.

In another embodiment, variations in the floor surface height from a calibration plane are known or determined for locations at which vehicle service fixtures are to be placed, enabling a corrected placement location for the vehicle service fixture to be identified to an operator. An optical distance measurement system disposed at a known location within the spatial reference system of the calibration plane is utilized to acquire a measure of distance to a surface on a measurement axis intersecting the placement location for the vehicle service fixture in the calibration plane. A comparison of the measured distance with a calculated distance identifies any variation in the floor surface height from the calibration plane at the placement location. In response to a comparison identifying a distance deviation exceeding an acceptable tolerance, a new orientation for the measurement axis is calculated to intersect a corrected placement location for the vehicle service fixture on the floor surface, providing an operator with a visual indication in the form of an illuminated point or line.

In a further method, the present disclosure sets forth a procedure to facilitate a proper placement of vehicle service fixtures without interference with a machine-vision vehicle inspection system normally positioned in front of the vehicle. With the vehicle positioned in a service area, and the vehicle inspection system initially disposed in front of the vehicle, the vehicle inspection system is operated to acquire a set of vehicle measurements from at least one wheel assembly on each lateral side of said vehicle, and to establish a vehicle frame of reference and/or a vehicle reference line from the acquired set of vehicle measurements. A first location of the vehicle inspection system relative to a visible reference point within the vehicle frame of reference having a determinable relationship with the vehicle is identified. To provide an unobstructed line of sight between the vehicle and a vehicle service fixture placement location within the vehicle service area in front of the vehicle, the vehicle inspection system is repositioned to a second location while maintaining the visible reference point within a field of view of at least one camera module, enabling the vehicle inspection system to identify the new location within said vehicle frame of reference relative to the visible reference point. Once repositioned, the vehicle inspection system is operated to provide a visual identification of the placement location for the vehicle service fixture within the vehicle frame of reference utilizing the identified second location and the vehicle reference line.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 2 is a top plan view of the prior art support structure of FIG. 1 disposed in proximity to a vehicle undergoing a measurement, inspection, or wheel alignment service;

FIG. 8 is a top plan view illustrating visible indicia projected with an optical projector coupled to the gimbal-mounted guidance system of FIG. 5;

FIG. 9 is a front view of an exemplary radar reflective corner cube target fixture;

FIG. 10 is a side view of the target fixture of FIG. 9; and

Corresponding reference numerals indicate corresponding parts throughout the several figures of the drawings. It is to be understood that the drawings are for illustrating the concepts set forth in the present disclosure and are not to scale.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

While the present disclosure sets for various embodiments in which cameras, laser emitters, range finders, etc., are disposed on a movable fixture or support structure for observing, illuminating, and measuring surfaces and/or other fixtures in proximity to the movable fixture or support structure, it will be understood by one of ordinary skill in the art that the relationships may be reversed without departing from the scope of the inventions, such that the cameras, laser emitters, range finders, etc., are disposed on the other fixtures and utilized to observe, illuminate, or measure distances to the movable fixture or support structure.

Figure 1:
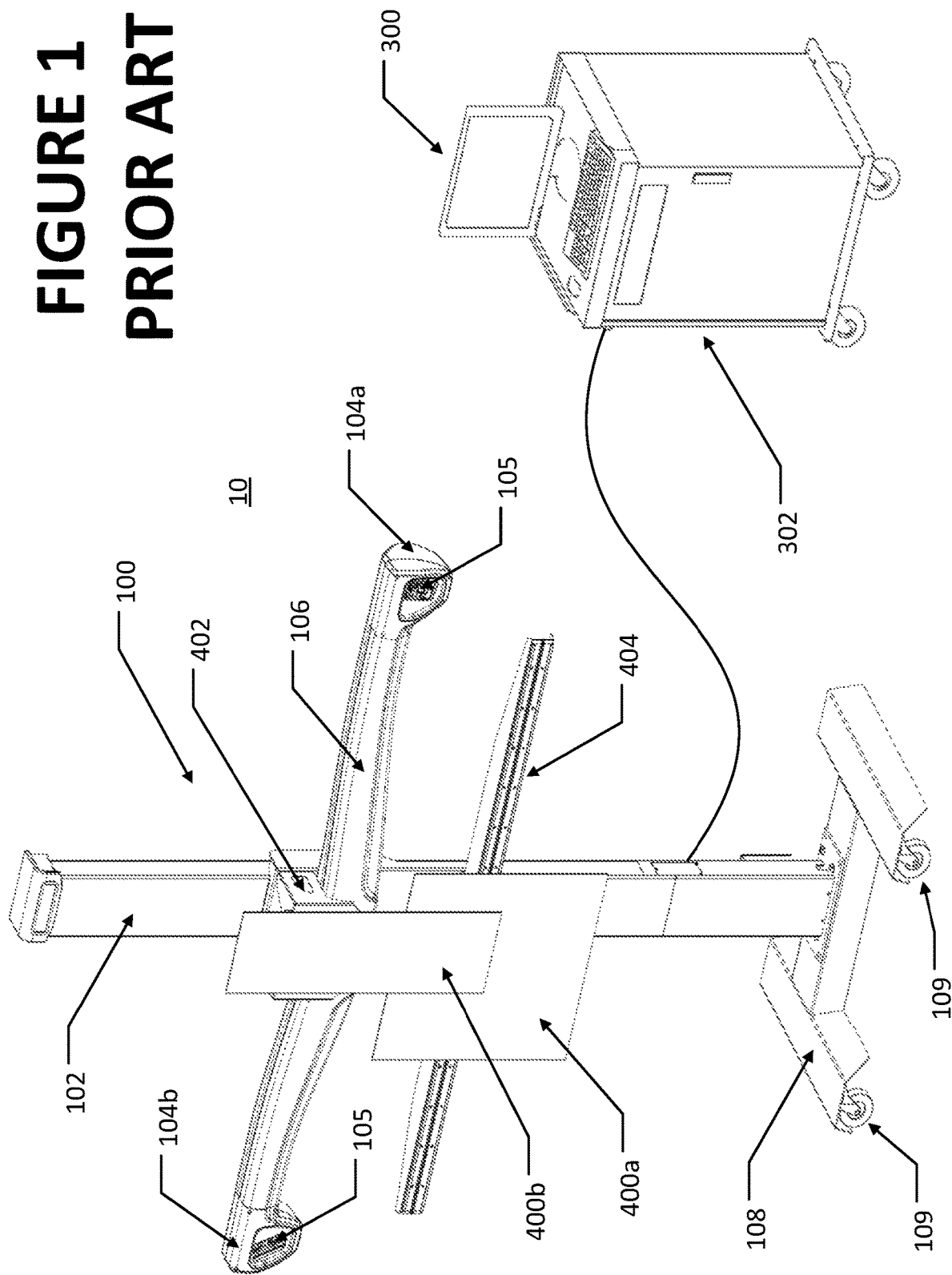
FIG. 1 is a perspective view of a prior art camera and a target support structure coupled to a control console.
Figure 3:
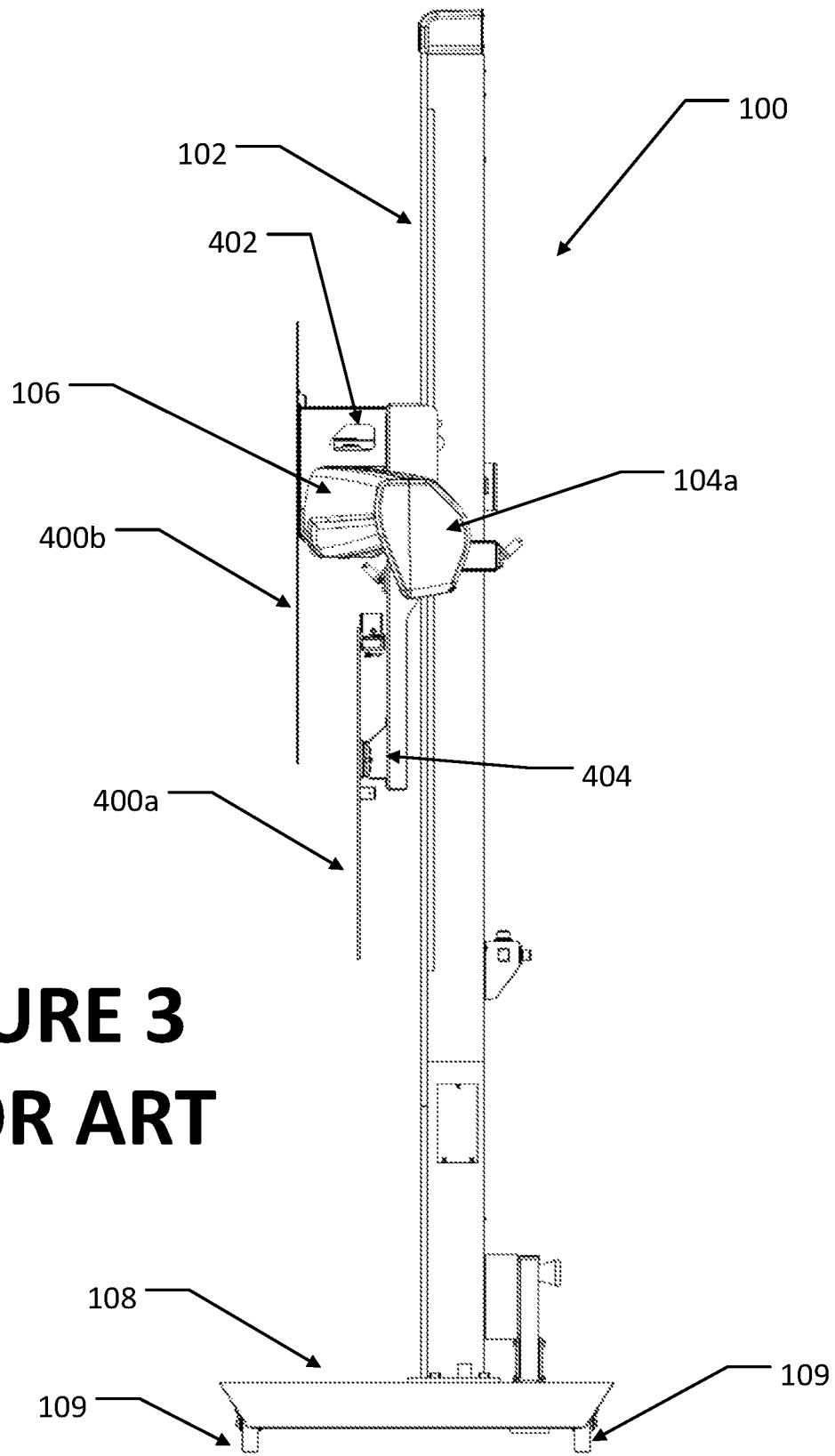
FIG. 3 is a side view of the prior art support structure of FIG. 1.

Turning to the figures, and to FIGS. 1-3 in particular, a vehicle measurement system instrumentation fixture or support structure 100 is shown, having a vertical column 102 supporting a set of laterally spaced camera modules 104a, 104b associated with a vehicle measurement system, such as a vehicle wheel alignment or inspection system. At least one vehicle calibration assistance structure, comprising a specialized target structure 400a, 400b is coupled to the support structure 100 and utilized to facilitate a process for realigning or recalibrating one or more safety system sensors onboard a vehicle 10 undergoing a service procedure in proximity to the support structure 100.

A camera crossbeam 106 carried by the vertical column 102 on the support structure 100 locates the set of camera modules 104a, 104b adjacent opposite longitudinal ends. Each camera module contains one or more fixed cameras 105 with fields of view oriented in a generally forward direction to observe each lateral side of the vehicle 10 undergoing service. The camera crossbeam 106 is optionally vertically (and/or rotationally about its longitudinal axis) adjustable relative to the vertical column 102 to accommodate elevation changes in the vehicle 10 if it is located on an adjustable lift rack (not shown), or to accommodate changes in the placement of the support structure 100 relative to the vehicle 10. Vertical and/or rotational adjustments to the camera crossbeam 106 may be manual or automatic, by any conventional means, such as sliding rails, rod and screw mechanisms, pulley mechanism, etc. As an alternative to rotationally adjusting the camera crossbeam 106, individual camera modules 104a, 104b may be configured with suitable coupling mechanisms to permit multi-axis independent movement as required to achieve desired fields of view with the cameras 105, and to facilitate positioning targets in proper locations.

It will be recognized that while the embodiments of the vehicle measurement system instrumentation structure illustrated in the Figures and described above utilize a vertical column 102 and a camera crossbeam 106, other configurations of a camera support structure 100 may be utilized without departing from the scope of the present invention. For example, in place of the vertical column 102 and camera crossbeam 106, a camera support structure 100 may consist of articulated camera support arms adapted to position individual cameras in laterally spaced arrangements as required to achieve the fields of view necessary to observe features or targets associated with a vehicle undergoing a wheel alignment service, measurement, or inspection.

The camera modules 104a, 104b are operatively coupled to a processing system 300, which may be disposed in an associated console 302 in proximity to the fixture or support structure 100. The processing system 300 is configured with suitable logic circuit components and with software instructions for receiving image data from the camera modules 104a, 104b, evaluating the image data from at least one of the camera module to identify relative spatial positions of observed surfaces, such as optical targets 11 disposed on the wheels 12 or surfaces of a vehicle 10, for performing spatial transformations between various individual frames of reference, and for computing associated vehicle characteristics, such as wheel alignment angles or vehicle body position. It will be understood that the configuration of the processing system 300, camera modules 104a, 104b, and console 302 are generally known in the art of machine vision vehicle wheel alignment systems, and may vary from the specific configuration described herein without departing from the scope of the invention, so long as the processing system 300 is capable of determining at least the relative spatial position of one or more observed surfaces associated with the vehicle 10.

To facilitate alignment and calibration of safety system sensors onboard a vehicle such as radar, LIDAR or optical sensors, one embodiment of the vehicle calibration assistance structure 100 includes at least one target structure 400a and/or 400b affixed to the camera support structure 100, such as to the vertical column 102 or camera crossbeam 106, by a multi-axis mounting fixture 402. Each target structure 400a, 400b includes an observable target face oriented in a generally forward direction from the fixture or support structure 100 (i.e., towards the vehicle service area), at an elevation generally suitable for observation by the safety system sensors onboard the vehicle 10 during a realignment or recalibration procedure. The specific configuration of the target structures 400a, 400b, such as the target face features, is related to, and will vary with, the specific type of safety system sensor for which it will be used. For example, an optical target 400a having retro-reflective or contrasting target face surface features may be provided for use with optical safety system sensors such as cameras or LIDAR. Correspondingly, a metallic or radar-reflective target 400b may be provided for use with radar-based safety system sensors. As seen in the various figures, multiple individual target structures of either the same or different types, may be secured to the vertical column 102 at different vertical elevations or horizontal separations.

The mounting fixture 402 may be a fixed mount which secures the target structures 400a, 400b in a fixed position and orientation relative to the vertical column 102, or optionally, may include suitable multi-axis mechanisms for adjusting the lateral position, vertical position, and/or orientation of the target structures 400a, 400b over a limited range relative to the vertical column 102, such as may be required for safety system sensors offset from a vehicle centerline CL or thrust line TL after the fixture or support structure 100 is disposed generally in front of the vehicle, as seen in FIG. 2. For example, a lateral support track 404 shown in FIGS. 1-4 may be coupled to the mounting fixture 402, parallel to the camera crossbeam 106 to support a target structure for sliding movement, enabling a lateral position of a target structure 400a to be adjusted.

In one embodiment, to facilitate positioning of the fixture or support structure 100 generally at the vehicle centerline CL (or thrust line) and to enable the set of camera modules 104a, 104b to view features on each lateral side of the vehicle 10, the fixture or support structure 100 is provided with a base structure 108 having a set of rolling elements, such as casters or wheels 109. Exemplary wheels may include omni-directional wheels such as Omni wheels or Mecanum wheels having small discs around their circumference. Optionally, the wheels may be coupled to a drive motor for powered movement of the support structure 100. During use, the fixture or support structure 100 is positioned manually by an operator, under operator control through the processing system 300, or automatically by the processing system 300, at a selected distance from the front of the lift rack or support surface on which the vehicle 10 is disposed during the measurement, inspection, or wheel alignment service procedure. Different vehicles may require the fixture or support structure 100 to be positioned at different locations relative to the vehicle. An optional locking mechanism may be provided on at least one of the rolling elements, to prevent accidental movement of the fixture or support structure 100 during use.

Precise position of the fixture or support structure 100 to place the target structure 400 in an ideal location for use may be carried out automatically or by the operator under the guidance of the processing system 300 in response to data acquired through the processing of images acquired by the camera modules 104a, 104b. For example, with the fixture or support structure 100 positioned generally on the centerline CL of a vehicle as seen in FIG. 2, (or alternatively to a determined thrust line of the vehicle) the camera modules 104a, 104b can acquire images of targets 11 associated with the front and rear wheels 12 on each lateral side of the vehicle, from which the processing system 300 identifies the position of the fixture or support structure relative to either a geometric centerline CL or a thrust line TL of the vehicle 10. If adjustments to the position of the fixture or support structure 100 relative to either the vehicle's geometric centerline CL or thrust line TL are required, suitable, signals directing movement are provided to the drive motors or operator by the processing system 300 based on the determined relative position of the fixture or support structure.

Positioning of the fixture or support structure 100, if adjustable, may be relative to a single axis which is generally transverse to the vehicle centerline CL (i.e., from side to side), or may be relative to an additional axis which is generally parallel to the vehicle centerline CL (i.e., towards or away from the vehicle). A vertical height of the set of the camera modules 104a, 104b is optionally adjusted by raising or lowering the camera crossbeam 106 along the vertical column 102.

Once the fixture or support structure is positioned at a desired location relative to the vehicle 10, adjustments to the position and orientation of the target structure 400a, 400b relative to the vertical column 102 for proper placement within a field of view associated with the onboard vehicle safety system sensors can be done via the mounting fixture 402. Suitable adjustment mechanisms within the mounting fixture 402 may include, but are not limited to, ball and socket connections, pivot arms, and the sliding rail or track 404. With the target structure 400a, 400b positioned at the desired location relative to the vehicle, and more specifically, relative to an onboard vehicle sensor, measurement, alignment, or calibration of the onboard vehicle sensor can proceed as understood in the art, by observing or illuminating the target structure 400 and responding accordingly.

Figure 5:
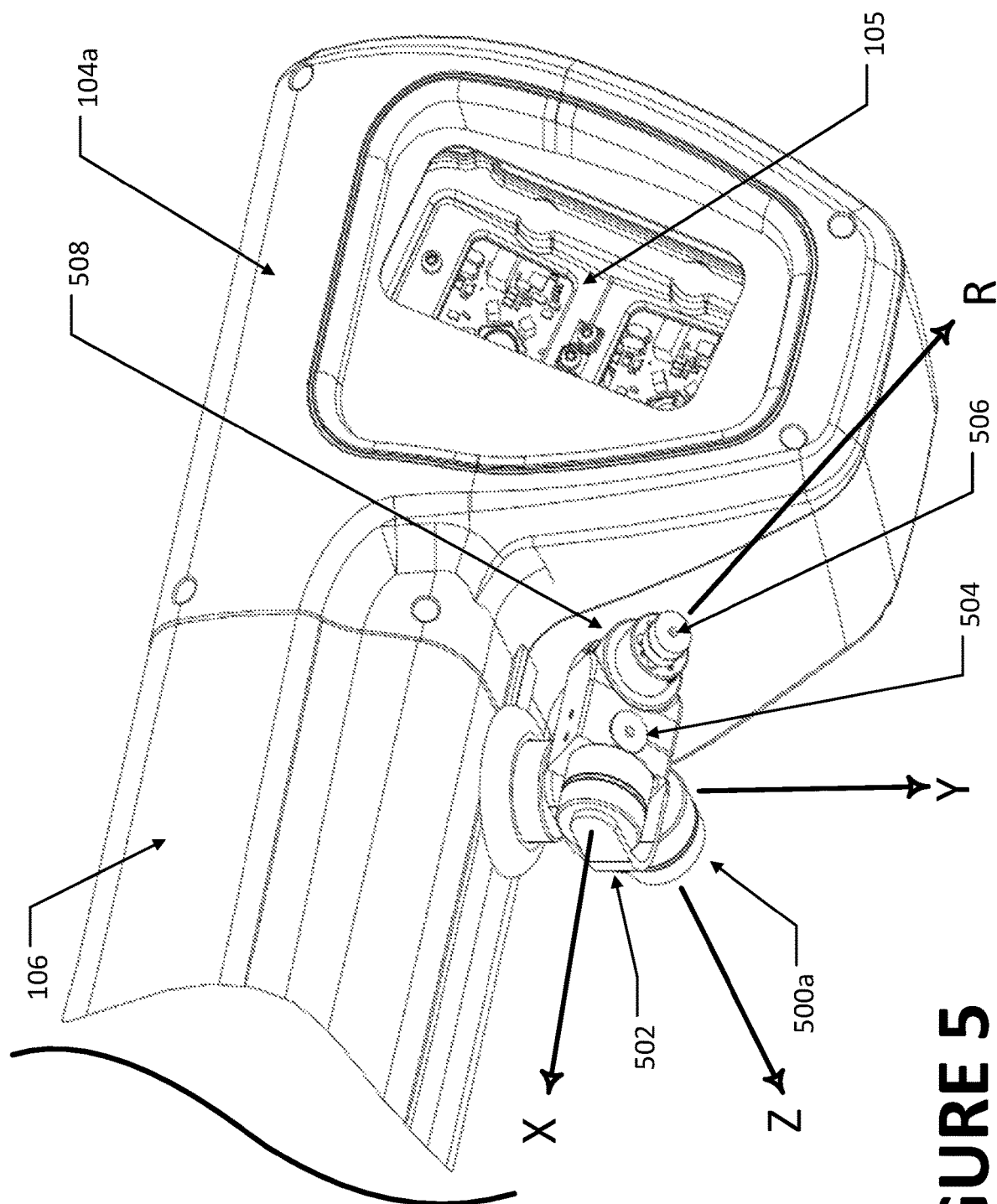
FIG. 5 is a close-up perspective view of a gimbal-mounted projection system of FIG. 4 mounted to the support structure.
Figure 6:
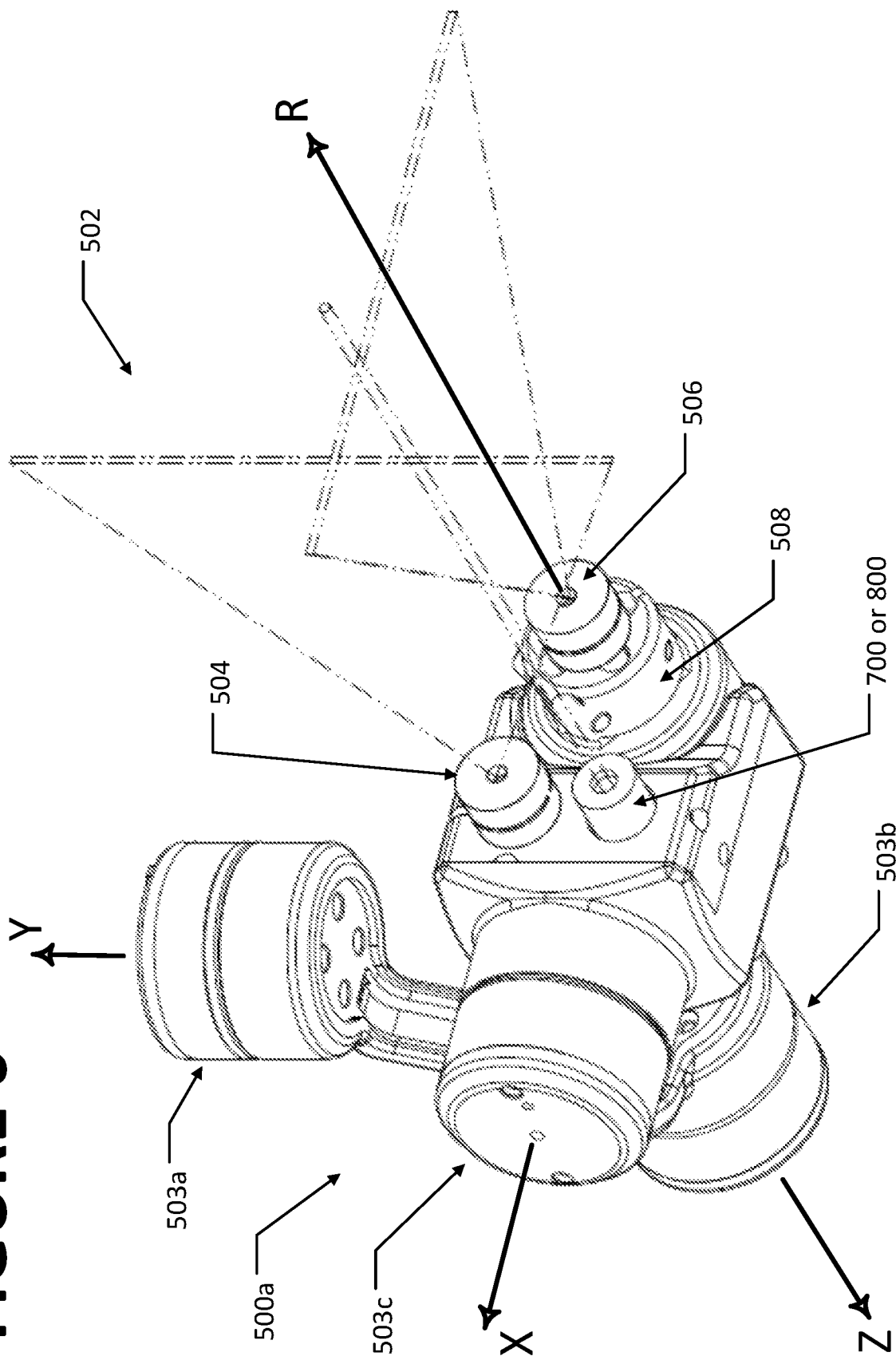
FIG. 6 is a front perspective view of an alternate gimbal-mounted projection and measurement system.
Figure 7:
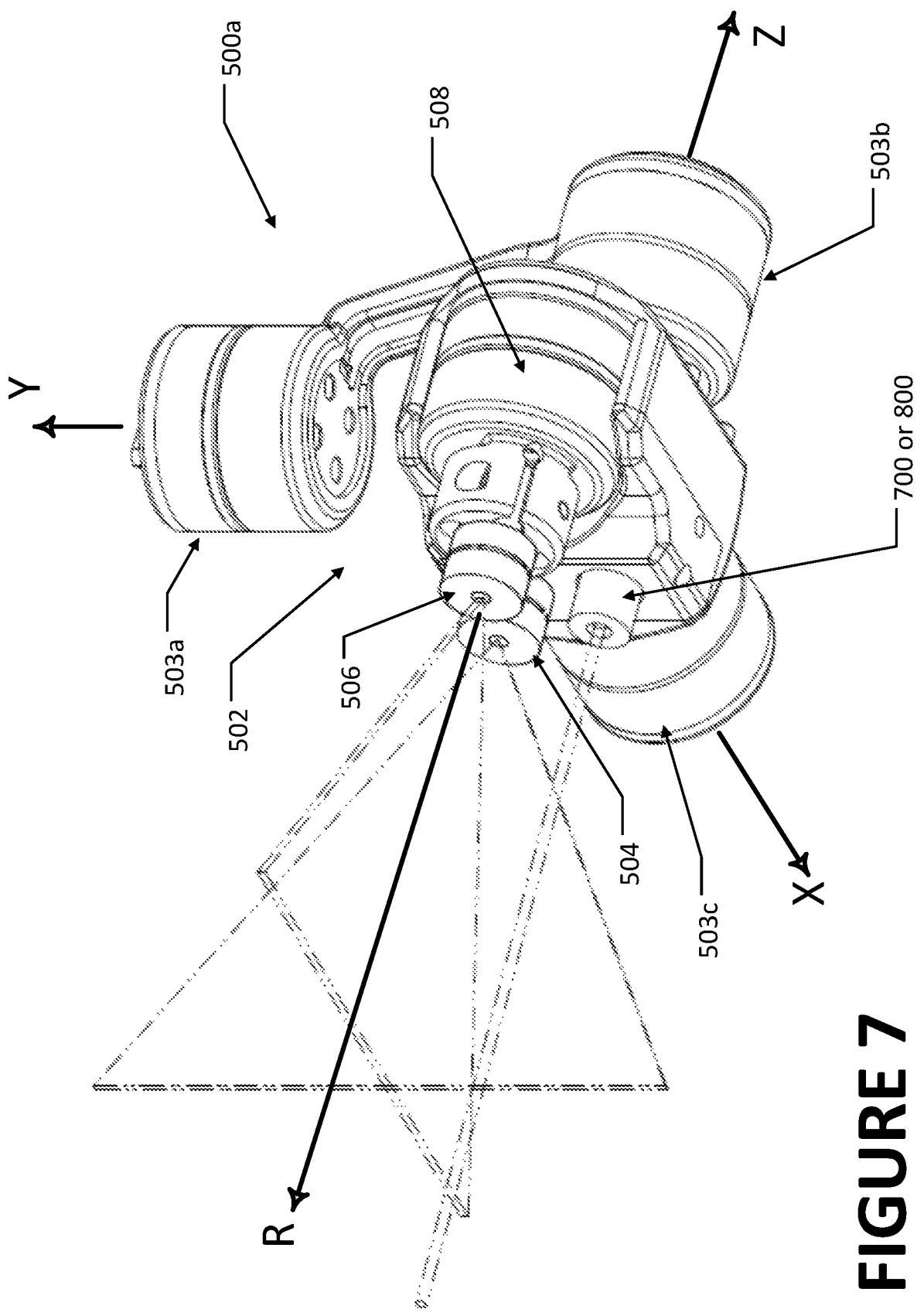
FIG. 7 is a rear perspective view of the gimbal-mounted projection and measurement system of FIG. 6.

The vehicle calibration assistance structure includes one or more optical projectors 500 operatively coupled to, and under control of, the processing system 300, for the projection of visible indicia 501 on to surfaces in proximity to the fixture or support structure, utilized to aid in the placement or alignment of vehicle service fixtures or targets. Exemplary surfaces onto which visible indicia may be projected include the vehicle body, wheel-mounted targets, targets or locations on the service bay floor surfaces, and movable targets located within the service bay. Each optical projector 500 as illustrated in FIGS. 5-7 comprises a pair of laser modules 500a and 500b. Each laser module is mounted on a set 502 of motorized multi-axis gimbals secured to the camera cross beam 106. The laser modules 500a, 500b are disposed in a laterally spaced arrangement on the camera cross beam 106, in proximity to the camera modules 104a and 104b, enabling projection of visible indicia onto surfaces located within the vehicle service area, such as adjacent each lateral side of the vehicle 10 as shown in FIG. 6. Each laser module 500a, 500b, as seen in FIG. 5, includes at least one laser line emitter 504 secured to the set 502 of gimbal motors 503a, 503b, and 503c for controlled rotational movement about at least two orthogonal axes (X, Y, and/or Z).

Optionally, as shown in FIGS. 6 and 7, second laser emitter 506 is supported by an outboard gimbal motor 508 on the mounting structure 502, for rotation about a fourth additional axis R, parallel to one of the orthogonal axes (X, Y, and/or Z), enabling projected indicia or laser lines to be rotated about the projection axis. Rotating one of the projected indicia or laser lines enables the processing system 300 to visually correct for parallax distortion resulting from non-orthogonal projection orientations. The laser emitters 504 and 506 each project beams 507 of visible light through associated optical focusing elements to illuminate visible indicia in the form of spots or lines, on the surfaces. It will be recognized that the optical projectors 500 may utilized other sources of visible light, such as LED elements, and associated optical focusing elements in place of the laser emitters 504, 506 to project indicia visible to an operator and/or to an observing camera system, such as spots or points, or illumination of different colors, onto the surfaces without departing from the scope of the present disclosure. Furthermore, the specific number of axes about which the optical projectors 500 are configured for movement may vary based on the intended use of the projected indicia. For example, optical projectors 500 intended to project indicia at a fixed location relative to the fixture or support structure 100 may be mounted in a fixed orientation, while optical projectors such as 500a and 500b which are intended to project indicia onto surfaces at varying locations relative to either the vehicle, fixture, or reference within the service bay, are mounted for rotational movement about multiple axes.

During a vehicle wheel alignment service, measurement, or inspection procedure, the processing system 300 is configured to control the set 502 of multi-axis gimbal mounting structures, and optional outboard gimbal motor 508, to orient each laser emitter 504, 506 to project the observable indicia 501 at a selected location on a surface in proximity to the fixture or support structure 100. The observable indicia 501 is configured to represent a stationary point location to aid in the placement of a vehicle service fixture 600, or to represent lines or boundaries against which an elongated planar optical target 602 or other vehicle service device may be aligned. The processing system 300 optionally controls the set of multi-axis gimbal mounting structures to impart motion to the projected indicia, such as to sequentially illuminate two or more discrete locations on said surface. Indicia other than points or lines, such as alphanumeric symbols, or raster images, or visible indicia of different colors, may be projected under control of the processing system 300 from suitably configured optical projectors 500 within the scope of the present disclosure.

In one embodiment, the selected location of the observable indicia 501 on the surface is determined by the processing system 300 in response to spatial measurements of associated with the vehicle 10 acquired from images captured by the camera modules 104, or is selected to be relative to a component of the fixture or support structure 100, such as an axis of the support column 102. For example, some vehicle safety system sensor calibration procedures require the placement of target structures, observable by onboard vehicle safety system sensors, at select locations relative to the vehicle. Specific placement requirements associated with safety system calibration procedures for a variety of vehicle makes and models may be stored in a database accessible to the processing system 300. After determining measurements associated with the relative spatial position of the vehicle 10 to the fixture or support structure 100, such as by conventional machine vision vehicle alignment measurement procedures, the processing system 300 is configured with software instructions to access the database to recall the placement requirements for visible targets or calibrations fixtures 600 associated with the vehicle. Utilizing the recalled placement requirements, the processing system 300 operates the set 502 of motorized gimbal mounting structures to directly orient the optical projectors to project visible indicia at the appropriate locations on the floor surface of the vehicle service area, enabling an operator to place targets or structures necessary to carry out or complete a vehicle service, calibration, or inspection procedure.

In a further embodiment, the processing system 300 utilizes images from the camera modules 104a, 104b to observe a location of the projected visible indicia relative to the vehicle, a wheel mounted target, or other reference location visible within images captured by the camera modules. The processing system 300 is configured with software instructions to utilize the observed location to operate the set 502 of motorized gimbal mounting structures to alter an orientation of the optical projectors to adjust the location of the projected indicia from the observed location to a location required for the operator to carry out or complete a vehicle service calibration or inspection procedure.

In addition to operating the set of motorized gimbal mounting structures to orient the optical projectors to project the visible indicia at the selected locations on the floor surface, the processing system 300 may be further configured to provide for motion stabilization of the projected visible indicia in response to movement of the fixture or support structure 100. Motion stabilization, via control of the set of motorized gimbal mounting structures, may be provided by the processing system 300 to maintain the projected visible indicia at the selected location during movement of the base 108 across the floor surface, as well as during vertical movement of the camera crossbeam 106.

In another embodiment, the fixture or support structure 100 is configured with at least one secondary optical camera system 700 mounted to a motorized multi-axis gimbal. The optical camera system has a field of view suitable for viewing targets disposed in proximity to the vehicle 10 and/or within the vehicle service area. The motorized multi-axis gimbal incorporates rotational position encoders associated with each rotational axis, such that a spatial orientation of the secondary optical camera system field of view can be identified, tracked, and controlled by the processing system 300.

Turning to FIGS. 6 and 7, the secondary optical camera system 700 may be supported directly on the motorized gimbal mounting structure 502 of one of the laser modules 500a or 500b, aligned with a field of view parallel to an axis of one of the associated laser emitters 504 and 506, eliminating the need for a separate motorized multi-axis gimbal dedicated to the camera system 700. With suitable software programming instructions, the processing system 300 utilizes the secondary optical camera system to observe targets 602 within a field of view associated with the current orientation of the laser module 500a, 500b onto which the camera system 700 is mounted. Proper placement of a target relative to the secondary optical camera system 700 or other established frame of reference, such as the vehicle (based on observations of wheel adapter targets) can be determined by the processing system 300 by analyzing an observed location of the target within the camera system field of view, together with gimbal encoder data identifying a multi-axis spatial orientation of the field of view (i.e., reference frame). If necessary, the processing system 300 can drive the motorized gimbal mounting structure 502 to orient the secondary optical camera system 700 field of view as required to observe an area in proximity to a vehicle or service bay in which a target 602 is expected to be placed. If the target is not observed within the field of view following the orientation of the secondary optical camera system 700, a warning or other suitable indication to an operator may be provided.

The processing system 300 may be configured with software instruction to utilize the secondary optical camera system 700 to determine if an external ADAS sensor target fixture 600 has been properly positioned relative to a location indicated by optical projector 500 on the fixture or support structure 100. Once the optical projector 500 is oriented to illuminate a specific point or location for placement of the external ADAS sensor target fixture 600, an operator moves or places the external ADAS sensor target fixture 600 at the indicated location. Preferably, the external ADAS sensor target fixture 600 includes a point or reference marking, such as a crosshair or bulls-eye icon, which is to be aligned with an illuminating laser from the optical projector 500. For the processing system 300 to determine if a point of illumination from a laser module 500a, 500b is aligned with an observable reference location on the external ADAS sensor target fixture 600, one or more images are acquired by the secondary optical camera system 700 oriented to view the indicated location. The acquired images are evaluated by the processing system to determine the proximity of the point of illumination to the reference marking.

Alternatively, the ADAS sensor target fixture 600 may be configured with an optical receptor responsive to incident illumination. The optical receptor may be integrated into the ADAS sensor target fixture 600, or may consist of a self-contained module suitable for placement on the fixture, target or other surface. In one configuration, the optical receptor is responsive to laser illumination to activate a visual indicator, such as an LED once the ADAS sensor target fixture 600 is properly positioned with respect to any incident laser illumination from the optical projector 500, enabling an operator to visually confirm proper placement.

Configured with software instructions, the processing system 300 can analyze images of the ADAS sensor target fixture 600 acquired by the secondary optical camera system 700, and confirm activation of, or a presence of, the visual indicator to verify proper positioning of the ADAS sensor target fixture 600. Alternatively, the optical receptor is configured to respond to incident illumination by emitting a wireless signal or other form of suitable feedback detectable by the processing system 300.

In addition to confirming proper positioning of an ADAS sensor target fixture 600, a feedback system responsive to incident illumination may be utilized to facilitate position calibration of the laser modules 500a, 500b by enabling the processing system 300 to confirm that the laser modules are accurately responding to commands for orientating the illuminating lasers about each rotational axis of the motorized gimbal mounting structure 502. The processing system 300 is configured with software instructions to drive the individual gimbal motors supporting each laser module in order to align the illuminating lasers with specific calibration targets in three-dimensional space. The calibration targets may optionally be located on the fixture or support structure 100 itself, enabling a self-calibration procedure. Failure to receive appropriate responsive feedback at the processing system 300, such as from an operator, from a visual indicator, or an emitted signal responsive to incident illumination, is an indication to the processing system 300 that the illuminating lasers are not oriented to properly illuminate the specific calibration point or reference marking. A suitable warning to an operator can be provided by the processing system 300, indicating the need for a corrective action or recalibration.

In a further embodiment, a non-contact distance measurement sensor 800 is secured to the motorized gimbal 502. The distance measurement sensor 800 may be any of a variety of suitable sensors, such as a laser range finder, a radar system, or a Lidar system, having an operating range suitable for determining distances to surfaces or targets disposed in proximity to the vehicle 10 and/or within the vehicle service area. The motorized gimbal 502 incorporates rotational position encoders associated with each rotational axis, such that a spatial orientation of a measurement axis associated with the distance measurement sensor 800 can be identified, tracked, and controlled by the processing system 300. Optionally, as seen in FIGS. 6 and 7, the distance measurement sensor 800, replacing the laser 700, may be supported directly on one of the laser modules 500a, 500b. With suitable software programming instructions, the processing system 300 utilizes the distance measurement sensor 800 to indicate placement locations for ADAS sensor target fixture 600 within a spatial frame of reference, compensate for variations in floor surface orientations, and to guide height and orientation adjustments for the camera crossbeam 106 or a placed ADAS sensor target fixture 600.

Proper spatial placement of an ADAS sensor target fixture 600 relative to a vehicle within an established frame of reference, is determined by the processing system 300. Initially, a frame of reference is established relative to the vehicle undergoing service or inspection. In one embodiment, shown in FIG. 8 the processing system 300 utilizes images acquired by the camera modules 104a, 104b, of optical targets 11 mounted to the wheels 12 of the vehicle, to establish a "floor plane" spatial reference system 120 defining an x-y plane on which the vehicle's four wheels 12 are disposed. A third-dimension z defines a height relative to the defined "floor plane" 120. The spatial location of the camera modules 104a, 104b, and hence the support structure 100 is identified within the established spatial reference system. The spatial location of the motorized gimbals 502 is known relative to that of the camera modules 104a, 104b either due to manufacturing tolerances or stored calibration values. Correspondingly, the spatial orientations the motorized gimbals 502 about each rotational axis is known relative to the camera modules 104a from the output of the associated rotational position encoders. Using the known spatial locations and spatial orientations, the processing system 300 is configured to identify spatial coordinates for a point of intersection 501a with the "floor plane" along a measurement axis of each gimbal-mounted distance measurement sensor 800 and/or along a projection axis of each laser module 500a, 500b. An actual height of the camera crossbeam 106 can be determined by orienting the motorized gimbals 502 to enable the distance measurement sensors 800 to obtain a measure of distance to the physical floor surface in proximity to the support structure 100. A measured difference between the actual camera crossbeam height and a calculated or expected height above the "floor plane" can be stored and utilized to offset or compensate vertical positioning of the camera crossbeam 106 or mounting fixture 402 as necessary.

To direct placement of an ADAS sensor target fixture 600 relative to the vehicle, the processing system 300 is configured to calculate the three-dimensional spatial coordinates of the point 501a within the "floor plane" 120 where a base of the ADAS sensor target fixture 600 is to be placed during a vehicle service procedure. Using the calculated point 501a, the processing system 300 directs a motorized gimbal 502 to orient about the various rotational axes until the measurement axis of the distance measurement sensor 800, or projection axis of the associated laser module 500a, 500b, intersects the calculated point 501a in the "floor plane" 120 of the vehicle. Once the measurement and/or projection axis is oriented to intersect the calculated point 501a, the processing system utilizes the distance measurement sensor 800 to acquire a measure of distance along the oriented axis to the physical floor surface, which may differ in elevation from the "floor plane" 120 of the vehicle. If the physical floor surface is coplanar with the determined "floor plane" 120 of the vehicle, the acquired measure of distance will equal a distance between the motorized gimbal 502 and the point 501a calculated by the processing system 300. If the physical floor surface is not coplanar with the determined "floor plane" 120 of the vehicle at the calculated point 501a, the measured distance will differ from the calculated distance. The processing system 300 is configured to compare the acquired measure of distance with the calculated distance to detect a difference which exceed an acceptable tolerance. In response to an detected difference exceeding tolerance, the processing system 300 is configured to determine a vertical (z-axis) offset for the calculated point 501a and a new orientation for the measurement and/or projection axis to compensate for the detected difference, such that a laser point 501 projected along the new projection axis to the new calculated point will illuminated a corrected placement position for the base of the ADAS sensor target fixture 600 on the physical floor surface, at a location which compensates for the height variation from the "floor plane" 120 of the vehicle.

Optionally, the processing system 300 is configured to direct a second motorized gimbal 502 to orient about its various rotational axes until a projection axis of a second laser module 500a, 500b projects an illuminated line which intersects the calculated point 501a, representing an orientation to which the base of the ADAS sensor target fixture 600 is to be aligned (or pointing) when placed at the illuminated point 501. For a "floor plane" defined by an x- and y-axis, the illuminated point 501 provides an x, y placement coordinate, offset along the z-axis, while the illuminated line provides an indication of rotation about the z-axis.

Once positioned at an indicated placement position, some fixtures 600 or targets 602 are configured to be oriented perpendicular to the "floor plane" of the vehicle when disposed on an angled or uneven physical floor surface. The processing system 300 is configured to facilitate orientation adjustments to the ADAS sensor target fixture 600 within the spatial reference frame using known or predetermined dimensions of the ADAS sensor target fixture 600. Alternatively, some ADAS sensor target fixtures 600 are configured to be oriented relative to gravity when disposed on the physical floor surface, and may include one or more bubble-levels to aid in achieving proper orientation.

When the ADAS sensor target fixture 600 is oriented at a desired orientation relative to the physical floor surface (or gravity), a selected point in proximity to the upper end of the ADAS sensor target fixture 600 is located at a calculable three-dimensional point in the spatial frame of reference. For a given placement position of the ADAS sensor target fixture 600 on the physical floor surface, the processing system 300 is configured to determine a projection axis for a laser module 500 which intersects the calculated point in the spatial frame of reference, and to drive the motorized gimbals 502 to align the laser module 500 there with. The processing system 300 activates the laser module 500 to project a laser beam along the calculated projection axis, enabling an operator to manually adjust an orientation of the ADAS sensor target fixture 600 at the placement position to bring the alignment point into intersection with the projected laser beam, i.e., into spatial alignment with the calculated point. With the alignment point illuminated by the projected laser beam, the ADAS sensor target fixture 600 is at the desired orientation relative to the physical floor surface. The orientation can be verified by the processing system utilizing a distance measurement sensor, and appropriate feedback provided to the operator to refine the orientation as needed to be within an acceptable tolerance. For example, the processing system 300 can direct an optical time-of-flight sensor to pulse or flash an illuminating beam of light along the projection axis until a measured distance to the alignment point is within an acceptable tolerance of a calculated distance.

A further adjustment to the ADAS sensor target fixture 600 may be required to ensure that a target component on the ADAS sensor target fixture 600 is disposed at a required vertical elevation above the "floor plane" of the vehicle with the ADAS sensor target fixture 600 at the proper orientation, i.e., displacement along the z-axis. Once the ADAS sensor target fixture 600 is positioned (and aligned) at the indicated placement position on the physical floor surface, and any required adjustments to the ADAS sensor target fixture 600 orientation are completed, a height adjustment is carried out. The processing system 300 calculates a spatial coordinate representative of the required vertical elevation for the target component relative to the "floor plane" of the vehicle, utilizing both the placement position of the ADAS sensor target fixture 600 on the physical floor, as well as the orientation there of. The calculated spatial coordinate of the target component is effectively, a point on an axis of the ADAS sensor target fixture 600 projected from the placement position. In order to identify the calculated spatial coordinate to the operator, the processing system 300 is configured to operate the motorized gimbals 502 to align the laser module 500 to project a laser beam along a projection axis which is intended to intersect a reference point on the ADAS sensor target fixture 600 at the required vertical elevation, i.e., the calculated spatial coordinates. The vertical elevation of the target component is adjusted to bring the reference point into alignment with the projected laser to within an acceptable tolerance, thereby positioning the target component at the required vertical elevation, completing the placement procedure.

Figure 11:
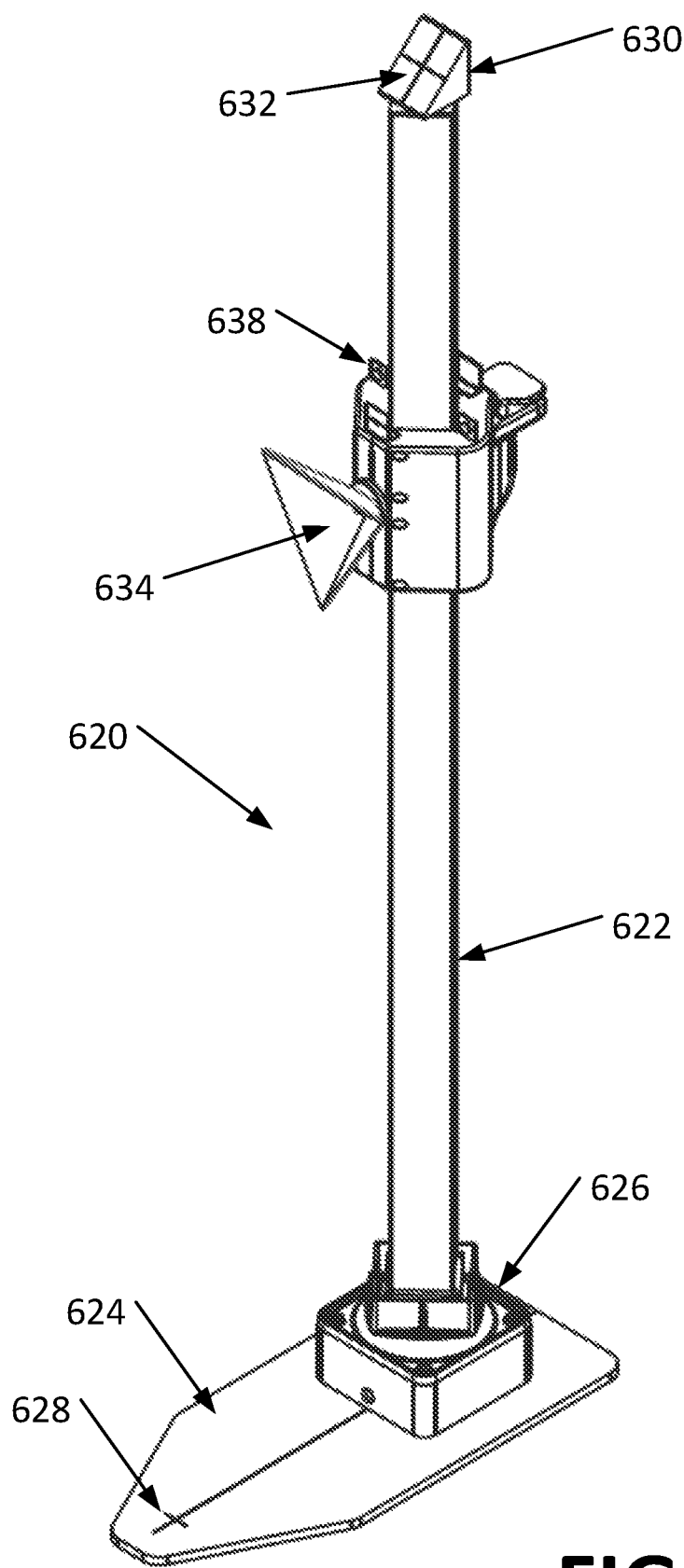
FIG. 11 is an isometric view of the target fixture of FIGS. 9 and 10.

Common ADAS sensor target fixtures 600 which can be positioned using the placement procedures of the present disclosure include optical targets and radar-reflective structures. An exemplary radar-reflective ADAS sensor target fixture 600 for use with the placement procedure of the present disclosure is a radar-reflective corner cube fixture 620 shown in FIGS. 9-11. The fixture 620 comprises an support column 622 mounted to a base 624 by a multi-axis pivoting coupling 626, such as a ball-and-socket joint. The base 624 is configured for placement on the physical floor of a vehicle service area, and includes one or more reference features 628 used to facilitate positioning. As seen in FIGS. 9 and 10, the reference features 628 may take the form of visible indicia such as alignment markings onto which illuminated points 501 can be projected during a positioning procedure, or may take the form of notches, recesses, or other fixed elements which can be brought into alignment with an illuminated point 501 or projected laser line.

The support column 622 has a known or determined length, and incorporates a reference surface 630 having alignment markings at a known position relative to an upper end opposite the coupling 626. By pivoting about the coupling 626, the support column 622 can be oriented to position the reference surface 630 within a spherical sector of space originating from the base 624, as is required to orient the fixture 620 relative to a floor plane 120 during a positioning procedure. Optionally, the reference surface 630 may be rotationally coupled to the support column 622 on a longitudinal axis extending from the coupling 626, enabling a reference marking 632 to be oriented towards an illuminating beam during a placement procedure.

In order to accommodate a variety of different vehicle radar systems, the fixture 620 includes a radar-reflective corner cube target 634 coupled to the support column 622 by an adjustable component 636. The adjustable component 636 is configured for movement along the support column 622 to alter an elevation of the target 634, and includes a clamping mechanism to hold the target 634 at a selected position on the support column 622. One or more reference features 638 including alignment markings are included on the adjustable component 636 which can be illuminated by projected indicia at a selected elevation during a placement procedure. Optionally, the reference feature 638 may be laterally offset from support column 622 and target 634 to provide an indication of a facing direction of the target 634 which can be verified by projection of an illuminating beam or distance measurement during the placement procedure. In an alternative configuration, the radar-reflective corner cube target 634 may be replaced by an optical target suitable for observation by an on-board vehicle camera system when positioned at the proper placement location, orientation, and vertical elevation within the spatial reference frame 120.

In a further embodiment, use of a laser range finder or laser displacement sensor 800 functions as an additional means by which the processing system 300 can project a point of illumination onto a variety of surfaces within proximity to the vehicle, fixture, or support structure 100. Utilizing the motorized gimbal 802 to orient the measurement axis of the laser displacement sensor or laser range finder 800 towards a selected location on a surface, the processing system 300 is configured to activate the laser displacement sensor or laser range finder to emit a laser beam along the oriented measurement axis, illuminating the selected location.

In one embodiment, the processing system 300 is configured with software instruction to utilize the measurement sensor 800 to determine if an ADAS sensor target fixture 600 has been properly positioned relative to a location indicated by an optical projector 500 on the fixture or support structure 100. Once the optical projector 500 is oriented to illuminate a specific point or location for placement of the ADAS sensor target fixture 600, an operator moves or places the external fixture or target at the indicated location. The processing system 300 utilizes the measurement sensor 800 to measure a distance from the fixture or support structure 100 along an axis oriented towards the specific point or location at which the external target 600 or fixture 602 is expected. If the ADAS sensor target fixture 600 is properly positioned, the processing system will measure an expected distance to a surface on the ADAS sensor target fixture 600 with the measurement sensor 800. If the measured distance is outside of an acceptable tolerance of the expected measurement, the processing system 300 is configured to provide the operator with a warning or other suitable indication that the external target or fixture 550 is not disposed at the expected location, and that corrective action may be required.

In a further variation, the processing system 300 may be configured with software instructions to utilize the measurement sensor 800 to locate a proper location for place of an external ADAS sensor target fixture 600 relative to either the vehicle or to the support structure 100. By controlling the motorized multi-axis gimbal 802, the processing system 300 can acquire distance measurement data from the measurement sensor 800 over an area or region in proximity to the vehicle or support structure 100. Once a location at a selected distance is identified from the measurement data, the processing system 300 utilizes an optical projector 500 and motorized multi-axis gimbal 502 to provide a visible indication of the location to an operator, or simply activates the optical projector 500 if the measurement sensor 800 is mounted on a common multi-axis gimbal.

For many vehicle inspection, service, or alignment adjustment procedures, it is beneficial (or required) to have the vehicle disposed on a level surface. When placing external fixture 600 or targets 602 in proximity to the vehicle, it is assumed that the fixtures or targets will be disposed on the same level surface as the vehicle. However, in most vehicle service shops, the floor surfaces of the vehicle inspection bays are not uniformly level. When a vehicle inspection, service, or alignment procedure requires that an external ADAS sensor target fixture 600 be disposed at a distance from the vehicle, errors or miscalculations in measurements may be introduced by uneven or un-level conditions in the service bay floor.

Figure 4:
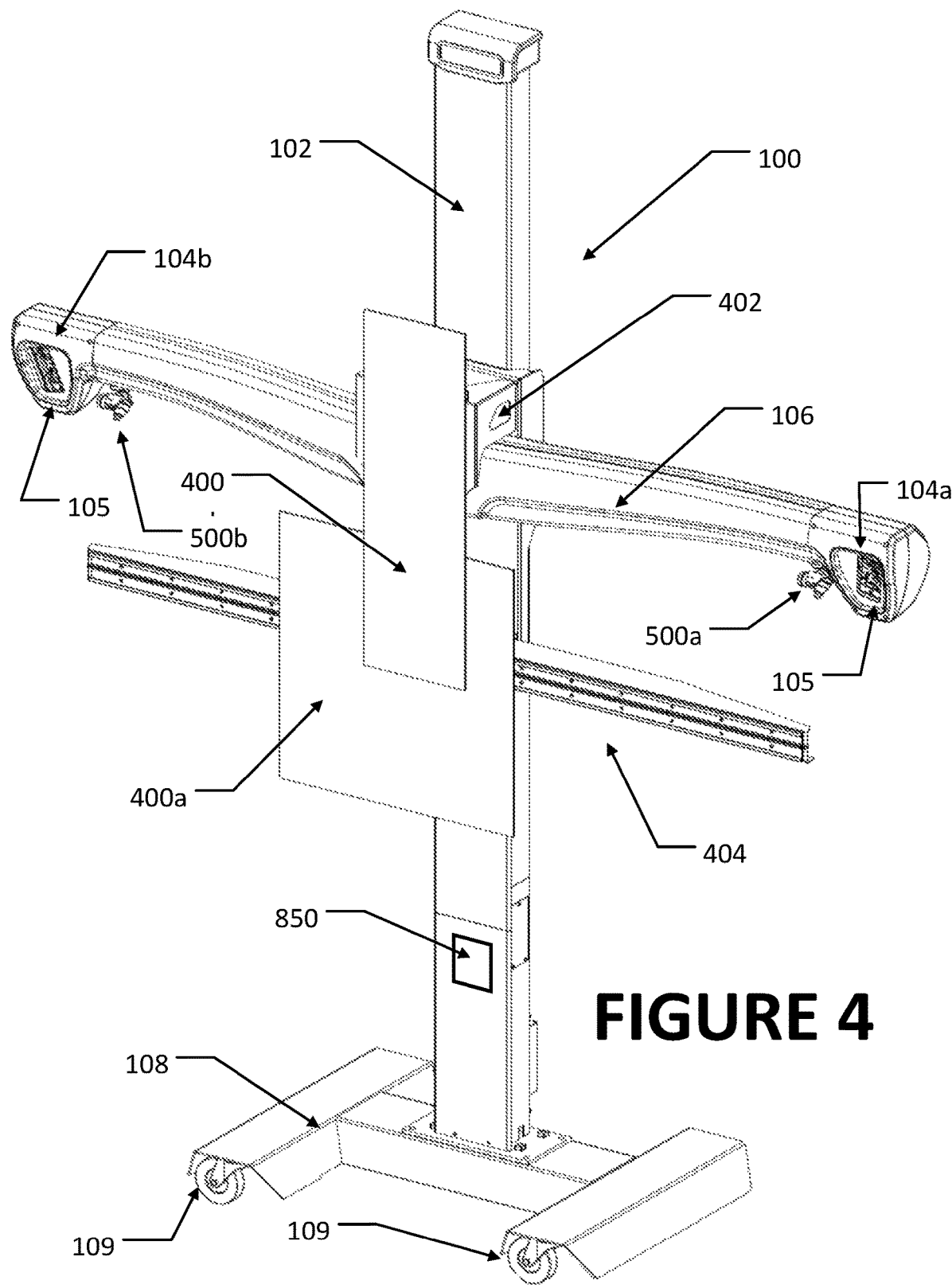
FIG. 4 is a perspective view of an embodiment of the present disclosure, illustrating a support structure configured with a pair of gimbal-mounted projection systems.

Establishing a horizontal reference plane can aid in the placement of ADAS sensor target fixtures 600 facilitates the inspection, service, or alignment of a vehicle when floor conditions are less than ideal. In an embodiment of the present disclosure, a laser projection system 850 disposed on the support structure 100, as seen in FIG. 4, is configured to establish a reference plane at a selected height relative to the vehicle. The laser projection system 850 may consist of a rotating laser or fan laser mounted to the support structure 100 at either a fixed or vertically adjustable location and aligned to project the laser in a horizontal plane. Alternatively, one of the gimbal mounted laser emitters on an optical projector 500a or 500b may be driven by the processing system 300 in a reciprocating or rotating movement about one axis of the gimbal structure to project a laser in a horizontal plane. The placement of the optical projectors 500a, 500b on the support structure 100 establishes a reference plane at a known vertical distance relative to the camera modules 104a, 104b. Once placed on the floor, the vertical height of the ADAS sensor target fixtures 600 can be adjusted relative to the established reference plane, rather than the uneven floor, such as by aligning index markings on the fixtures or targets with the rotating laser or fan laser illumination, or by guided adjustment in response to feedback provided by the processing system 300 based on observations of the fixtures 600 or target 602.

It will be further recognized that the establishment of a horizontal reference plane may be carried out prior to vehicle measurement or inspection, and utilized to characterize the contours of the floor surface of the vehicle service bay during a set up or calibration process. With the horizontal reference plane established, an ADAS sensor target fixture 600 is moved about the vehicle service bay to various locations. At each location, the position of the ADAS sensor target fixture 600 relative to the vertical height of the horizontal reference plane is identified, effectively mapping a displacement between the floor surface and the reference plane at each location. Granularity of the mapping is directly connected to the number of locations at which the ADAS sensor target fixture 600 is positioned. Once the floor surface is characterized, during a vehicle service or inspection procedure, appropriate measurement offsets or corrective values can be applied to measurements acquired from the vehicle wheels, targets 602, or fixtures 600 based on an associated location on the characterized floor surface.

The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A method for placement of a vehicle service fixture relative to a vehicle undergoing service or inspection, comprising:
  establishing a spatial reference frame;
  identifying a location of said vehicle within said spatial reference frame;
  identifying, within said spatial reference frame, a three-dimensional location and spatial orientation of a multi-axis gimbal supporting at least an optical time-of-flight sensor configured to measure distance along a measurement axis;
selecting within said spatial frame of reference, a location for placement of said vehicle service fixture relative to said vehicle;
utilizing said multi-axis gimbal three-dimensional location, calculating an orientation for said multi-axis gimbal to align said measurement axis with said selected placement location in said spatial frame of reference;
driving said multi-axis gimbal to said calculated orientation;
acquiring a measurement of distance to a surface along said measurement axis of said time-of-flight sensor;
comparing said acquired measurement of distance to said surface with an expected distance between said optical time-of-flight sensor and said selected placement location in said spatial frame of reference along said measurement axis;
responsive to a difference between said acquired measurement of distance and said expected distance exceeding a tolerance, calculating a corrected placement location on said surface and an adjustment to a vertical elevation of said vehicle service fixture at said selected placement location within said spatial reference frame; and
positioning said vehicle service fixture on said surface at said corrected placement location and at said adjusted vertical elevation.

2. The method of claim 1 wherein said established spatial reference frame is a floor plane reference for said vehicle, and wherein said surface is a physical floor surface.

3. The method of claim 1 wherein positioning said vehicle service fixture includes directing an operator by projecting an illuminating laser beam along said measurement axis to intersect said surface at said corrected placement location.

4. The method of claim 1 wherein establishing said spatial reference frame includes acquiring images of a set of optical targets associated with the wheels of said vehicle; and
evaluating said acquired images to establish a floor plane upon which said wheels of said vehicle are disposed, said established floor plane defining said spatial reference frame.

5. A method for locating a vehicle service fixture in three-dimensional space relative to a vehicle, comprising:
establishing a three-dimensional spatial reference frame associated with said vehicle, said three-dimensional spatial reference frame including a two-dimensional floor plane defined relative to said vehicle;
identifying, within said established spatial reference frame, a three-dimensional location and spatial orientation of a multi-axis gimbal supporting at least an optical time-of-flight sensor configured to measure distance along a measurement axis using a projected point of illumination;
locating a placement position on said floor plane for placement of a vehicle service fixture base;
directing placement of said vehicle service fixture base at said located placement position by orienting said optical time-of-flight sensor to project said point of illumination at said located placement position;
identifying a position within said three-dimensional spatial reference frame for a selected point on said vehicle service fixture when said vehicle service fixture is aligned to a selected orientation relative to said floor plane;
guiding an orientation of said vehicle service fixture at said placement position to align said selected point with said identified position;
calculating a vertical elevation for a target element on said vehicle service fixture at said placement position and orientation of said vehicle service fixture within said established spatial frame of reference; and
guiding an adjustment of said target element on said vehicle service fixture to said calculated vertical elevation.

6. The method of claim 5 wherein guiding said orientation includes orienting said optical time-of-flight sensor to project said point of illumination at said identified position within said three-dimensional spatial reference frame for said selected point on said vehicle service fixture; and
wherein guiding said adjustment of said target element to said calculated vertical elevation includes orienting said optical time-of-flight sensor to project said point of illumination at a second identified position within said three-dimensional spatial reference frame for a second selected point on said vehicle service fixture, said second selected point having a fixed relationship to said target element.

7. The method of claim 5 further including identifying, within said established spatial frame of reference, a three-dimensional location and spatial orientation of a second multi-axis gimbal supporting at least a laser line projector configured to project an illuminating laser line along a projection axis; and
wherein directing placement of said vehicle service fixture base at said located placement position includes orienting said laser line projector to project said illuminating laser line across said located placement position at a selected orientation for said vehicle service fixture base.

8. The method of claim 6 wherein guiding said orientation of said vehicle service fixture at said placement position to align said selected point with said identified position includes orienting said optical time-of-flight sensor to project said point of illumination along an axis intersecting said identified position.

9. The method of claim 6 wherein guiding said adjustment of said target element on said vehicle service fixture to said calculated vertical elevation includes orienting said optical time-of-flight sensor to project said point of illumination along an axis intersecting said calculated vertical elevation at said placement position and orientation of said vehicle service fixture.

10. A method for facilitating placement of a vehicle service fixture relative to a vehicle undergoing service or inspection, comprising:
establishing a spatial reference frame;
identifying a location of said vehicle within said spatial reference frame;
identifying, within said spatial reference frame, a three-dimensional location of a sensor configured to measure a distance along a measurement axis originating at said sensor;
determining within said spatial frame of reference, a location for placement of said vehicle service fixture relative to said vehicle;
calculating a spatial orientation for said sensor to align said measurement axis with said selected placement location using said identified three-dimensional location;
orienting said sensor into alignment with said calculated spatial orientation;

acquiring a measurement of distance from said sensor to a surface along said measurement axis;

comparing said acquired measurement of distance to said surface with an expected distance between said sensor and said selected placement location along said measurement axis;

responsive to a difference between said acquired measurement of distance and said expected distance exceeding a tolerance, calculating a corrected fixture placement location on said surface by altering said selected placement location within said spatial reference frame; and identifying said corrected placement location to an operator to facilitate positioning of said vehicle service fixture at said corrected placement location.

11. The method of claim 10 wherein said established spatial reference frame is a floor plane reference for said vehicle, and wherein said surface is a physical floor surface.

12. The method of claim 10 wherein identifying said corrected placement location includes projecting light to illuminate a point on said surface at said corrected placement location.

13. A method for facilitating placement of a vehicle service fixture relative to a vehicle undergoing service or inspection, comprising:

establishing a spatial reference frame;

identifying a location of said vehicle within said spatial reference frame;

identifying, within said spatial reference frame, a three-dimensional location of a sensor configured to measure distance along a measurement axis;

determining within said spatial frame of reference, a location for placement of said vehicle service fixture relative to said vehicle;

calculating a spatial orientation for said sensor to align said measurement axis with said selected placement location using said identified three-dimensional location;

orienting said sensor into alignment with said calculated spatial orientation;

acquiring a measurement of distance to a surface along said measurement axis;

comparing said acquired measurement of distance to said surface with an expected distance between said sensor and said selected placement location along said measurement axis;

responsive to a difference between said acquired measurement of distance and said expected distance exceeding a tolerance, calculating a corrected placement location on said surface by altering said selected placement location within said spatial reference frame;

identifying said corrected placement location to an operator to facilitate positioning of said vehicle service fixture at said corrected placement location;

wherein establishing said spatial reference frame includes acquiring images of a set of optical targets associated with the wheels of said vehicle; and evaluating said acquired images to establish a floor plane upon which said wheels of said vehicle are disposed, said established floor plane defining said spatial reference frame.

14. The method of claim 13 wherein acquiring said measurement of distance to a surface includes calculating time of flight for light projected along said measurement axis from said sensor to said selected placement location.

15. The method of claim 13 wherein orienting said sensor into alignment with said calculated spatial orientation includes rotating one or more gimbal mountings supporting said sensor.

16. The method of claim 13 wherein calculating a corrected placement location on said surface includes determining an elevation difference between said selected placement location and said surface.

17. The method of claim 16 further including displaying said determined elevation difference to said operator, said elevation difference representative of an elevation difference between a floor surface and a vehicle reference plane.

* * * * *